(12) United States Patent
Terada et al.

(10) Patent No.: US 8,903,791 B2
(45) Date of Patent: Dec. 2, 2014

(54) STATISTICAL INFORMATION GENERATION SYSTEM AND STATISTICAL INFORMATION GENERATION METHOD

(75) Inventors: Masayuki Terada, Tokyo (JP); Ichiro Okajima, Tokyo (JP); Yuki Oyabu, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 79 days.

(21) Appl. No.: 13/642,643

(22) PCT Filed: Apr. 6, 2011

(86) PCT No.: PCT/JP2011/058730
§ 371 (c)(1),
(2), (4) Date: Nov. 30, 2012

(87) PCT Pub. No.: WO2011/132534
PCT Pub. Date: Oct. 27, 2011

(65) Prior Publication Data
US 2013/0073577 A1    Mar. 21, 2013

(30) Foreign Application Priority Data
Apr. 23, 2010    (JP) ................................ 2010-099855

(51) Int. Cl.
*G06F 17/30*    (2006.01)
*G06Q 30/02*    (2012.01)

(52) U.S. Cl.
CPC ..................................... *G06Q 30/02* (2013.01)
USPC ......................................... 707/705; 707/758

(58) Field of Classification Search
USPC ................................................. 707/705, 758
See application file for complete search history.

(56) References Cited

U.S. PATENT DOCUMENTS

| 8,275,758 | B2 * | 9/2012 | Tanabe et al. ................. 707/706 |
| 8,352,493 | B2 * | 1/2013 | Johnston et al. .............. 707/770 |
| 8,359,238 | B1 * | 1/2013 | Kauchak et al. ........... 705/14.66 |
| 8,401,899 | B1 * | 3/2013 | Kauchak et al. ........... 705/14.43 |
| 8,428,520 | B2 * | 4/2013 | Kobayashi et al. ......... 455/67.13 |
| 8,649,777 | B2 * | 2/2014 | Witzel et al. ............... 455/414.1 |
| 8,656,348 | B2 * | 2/2014 | Smialek et al. ............... 717/106 |

FOREIGN PATENT DOCUMENTS

| JP | 2002 268950 | 9/2002 |
| JP | 2003 30373 | 1/2003 |
| JP | 2003 122877 | 4/2003 |

(Continued)

OTHER PUBLICATIONS

Adam, N.R., et al., "Security-Control Methods for Statistical Databases: A Comparative Study," ACM Computing Surveys, vol. 21, No. 4, pp. 515-556, (Dec. 1989).

(Continued)

*Primary Examiner* — Kim Nguyen
(74) *Attorney, Agent, or Firm* — Oblon, Spivak, McClelland, Maier & Neustadt, L.L.P.

(57) ABSTRACT

A statistical information generation system includes a condition input section, an extracting section that extracts unidentifiable location data and unidentifiable attribute data, a magnification factor adding section that adds a magnification factor to the unidentifiable attribute data, a statistics section that calculates statistical data by using the unidentifiable location data, the unidentifiable attribute data, and the magnification factor, a counting section that counts the unidentifiable location data, a determining section that determines a magnitude of the number of pieces of data, and an output section that hides the statistical data to output the statistical data.

9 Claims, 10 Drawing Sheets

(56) References Cited

FOREIGN PATENT DOCUMENTS

| | | |
|---|---|---|
| JP | 2005 234866 | 9/2005 |
| JP | 2005 286657 | 10/2005 |
| JP | 2009 98805 | 5/2009 |
| KR | 10-0818549 | 4/2008 |

OTHER PUBLICATIONS

"Statistical Policy Working Paper 22 (Second version, 2005) Report on Statistical Disclosure Limitaion Methodology," Federal Committee on Statistical Methodology, Office of Management and Budget, pp. 12-24, (Dec. 2005).

International Search Report Issued May 17, 2011 in PCT/JP11/58730 Filed Apr. 6, 2011.

International Preliminary Report on Patentability and Written Opinion issued Nov. 15, 2012, in International Application No. PCT/JP2011/058730.

Korean Office Action issued Dec. 20, 2013 in Patent Application No. 10-2012-7029458 with English Translation.

Office Action issued Jul. 11, 2014 in Korean Patent Application No. 10-2012-7029458 (with English language translation).

\* cited by examiner

*Fig.2*

| FIRST IDENTIFICATION INFORMATION (LINE NUMBER) | LOCATION INFORMATION | TIME | ... |
|---|---|---|---|
| ⋮ | ⋮ | ⋮ | ... |
| 090-XXXX-XXXX | X1,Y1 | 2010/5/30 12:24:58 | ... |
| ⋮ | ⋮ | ⋮ | ... |

*Fig.3*

| SECOND IDENTIFICATION INFORMATION (LINE NUMBER) | ATTRIBUTE INFORMATION (ADDRESS) | ATTRIBUTE INFORMATION (SEX) | ATTRIBUTE INFORMATION (AGE) | ... |
|---|---|---|---|---|
| ⋮ | ⋮ | ⋮ | ⋮ | ... |
| 090-XXXX-XXXX | TOKYO, SHINJUKU-KU | MALE | THIRTIES | ... |
| ⋮ | ⋮ | ⋮ | ⋮ | ... |

STATISTICAL INFORMATION GENERATION SYSTEM AND STATISTICAL INFORMATION GENERATION METHOD

TECHNICAL FIELD

The present invention relates to a statistical information generation system and a statistical information generation method.

BACKGROUND ART

A device for acquiring location information of a portable terminal and analyzing population distribution of users of the portable terminal on the basis of the location information has been known (refer to Patent literatures 1 and 2). By using the location information of the portable terminal in this manner, unlike in the case of using demographic data acquired by a population census and the like, the population distribution reflecting users' moving tendency as well can be acquired.

For example, a device described in Patent literature 1 calculates population distribution corresponding to target areas and target demographics by using a database that stores location information on each portable terminal. Moreover, a device described in Patent literature 2 generates an aggregate result of response signals of terminals that receive a terminal confirmation signal for each base station, as population density information.

Such conventional statistical processing of the population distribution uses operational data such as portable terminal location data and user attribute data, as data for offering telecommunication service to the portable terminal user. By applying statistical processing such as counting to the operational data, an estimated value related to the movement of population including "population distribution", "number of moving people", and "population composition" can be acquired. Here, the "population distribution" means the number of population distributed in each area, the "number of moving people" means the number of people moving between the areas, and the "population composition" means population distribution and number of moving people, which are divided according to sex, age demographic.

CITATION LIST

Patent Literature

[Patent Literature 1] Japanese Patent Laid-Open No. 2003-30373
[Patent Literature 2] Japanese Patent Laid-Open No. 2005-286657

SUMMARY OF INVENTION

Technical Problem

However, in the above-mentioned conventional statistical processing, since all the people to be counted do not have their own portable terminals, the accurate movement of population cannot be obtained merely by summing location data of the portable terminals. To obtain the accurate movement of population, for example, by multiplying the location data obtained from the portable terminals by the reciprocal of a subscription ratio for each attribute of subscribers of the portable terminals to calculate the weighted sum, it is needed to estimate the entire population including persons having no portable terminal to be counted.

Accordingly, when it is attempted to estimate the movement of population according to the conventional statistical processing technology, the following problem occur. Specifically, it is a problem of hiding. When the statistical processing is performed, information of individual portable terminals is lost and only statistical tendency of a group is represented in an aggregate result. However, when aggregate information is generated in a too minute aggregate range during the course of the statistical processing, a personal identity may appear in the statistical data. On the other hand, when the aggregate information is generated in a too rough aggregate range, usability of estimated data is degraded. To solve the problem, in a conventional public statistical processing, resultant statistical data may be subjected to processing called "hiding processing". That is, a value in an aggregate table falls below a certain value (referred to as a hiding reference), the aggregate result is not displayed, or displayed as zero. However, as described above, in population estimation using the location data from a mobile phone network, since the weighted sum obtained by multiplying the data by different weights for different attributes of the subscribers is found, the necessity or unnecessity of hiding cannot be determined merely by comparing the estimated value with the hiding reference in magnitude.

Therefore, the present invention is made in consideration of such problem, and its object is to provide a statistical information generation system and a statistical information generation method, which can hide personal identities in statistical data in the case of using location data obtained via a mobile phone network.

Solution to Problem

To solve the above-mentioned problem, a statistical information generation system of the present invention includes: a first input means that inputs location information-storing data including first identification information identifying a mobile communication terminal, location information on a location of the mobile communication terminal, and time information on a time when the location information is acquired; a second input means that inputs attribute information-storing data including second identification information identifying a mobile communication terminal, and attribute information on a subscriber of the mobile communication terminal; a condition input means that inputs search condition information for the location information-storing data and the attribute information-storing data; an extracting means that extracts a part of the location information-storing data and the attribute information-storing data on the basis of the search condition information; a magnification factor adding means that adds to the attribute information-storing data extracted by the extracting means, a magnification factor corresponding to attribute information included in the attribute information-storing data and indicating a degree of magnification to a value of statistical target; a statistics means that calculates and outputs statistical data on population by using the location information-storing data extracted by the extracting means, the attribute information-storing data extracted by the extracting means and having the second identification information corresponding to the first identification information included in the location information-storing data, and the magnification factor added to the attribute information-storing data; a counting means that counts a number of pieces of the location information-storing data extracted by the extracting means; a determining means that determines a magnitude of the number of pieces of data by comparing the number of pieces of data counted by the counting means with a predetermined value; and an output means that outputs the statistical data when the determining means determines that the number of pieces of data is large, and hides a value included in the statistical data to output the statistical data when the determining means determines that the number of pieces of data is small.

Alternatively, a statistical information generation method of the present invention includes: a first input step of, in a first input means, inputting location information-storing data including first identification information identifying a mobile communication terminal, location information on a location of the mobile communication terminal, and time information on a time when the location information is acquired; a second input step of, in a second input means, inputting attribute information-storing data including second identification information identifying a mobile communication terminal, and attribute information on a subscriber of the mobile communication terminal; a condition input step of, in a condition input means, inputting search condition information for the location information-storing data and the attribute information-storing data; an extracting step of, in an extracting means, extracting a part of the location information-storing data and the attribute information-storing data on the basis of the search condition information; a magnification factor adding step of, in a magnification factor adding means, adding to the attribute information-storing data extracted by the extracting means, a magnification factor corresponding to attribute information included in the attribute information-storing data and indicating a degree of magnification to a value of statistical target; a statistic step of, in a statistics means, calculating and outputting statistical data on population by using the location information-storing data extracted by the extracting means, the attribute information-storing data extracted by the extracting means and having the second identification information corresponding to the first identification information included in the location information-storing data, and the magnification factor added to the attribute information-storing data; a counting step of, in a counting means, counting a number of pieces of the location information-storing data extracted by the extracting means; a determining step of, in a determining means, determining a magnitude of the number of pieces of data by comparing the number of pieces of data counted by the counting means with a predetermined value; and an output step of, in an output means, outputting the statistical data when the determining means determines that the number of pieces of data is large, and hiding a value included in the statistical data to output the statistical data when the determining means determines that the number of pieces of data is small.

According to such statistical information generation system or statistical information generation method, demographic data taking the degree of magnification to a value of statistical target into consideration is calculated from the location information-storing data and the attribute information-storing data on the basis of the search condition. Further, information as a material for determining the necessity or unnecessity of hiding of the statistical data is provided by counting the estimated data as the estimated value of population taking the subscription ratio of the portable terminal according to attribute into consideration as well as the number of pieces of data as the true number of pieces of location data used to generate the estimated data.

Furthermore, it is determined whether or not the estimated statistical data is generated from a "small group", on the basis of the above mentioned number of pieces of data, and the statistical data is hidden based on the determination result. Whether or not the estimated statistical data is generated from a "small group" cannot be determined only based on the statistical figure in statistical data. This is due to that the statistical figure is derived according to expansion estimation based on the subscription ratio of the portable terminal, which varies according to attribute. Thus, by using the counted number of pieces of data, whether or not the counted data is generated from a "small group" can be accurately determined.

As a result, personal identities in the statistical data estimated based on the location information-storing data and the attribute information-storing data can be hidden.

Advantageous Effects of Invention

According to the present invention, in the case of using the location data obtained via the mobile phone network, personal identities in the statistical data can be hidden.

BRIEF DESCRIPTION OF DRAWINGS

FIG. 2 is a view showing a data structure of location information-storing data input to a first input section in FIG. 1.

FIG. 3 is a view showing a data structure of attribute information-storing data input to a second input section in FIG. 1.

DESCRIPTION OF EMBODIMENTS

Figure 1:
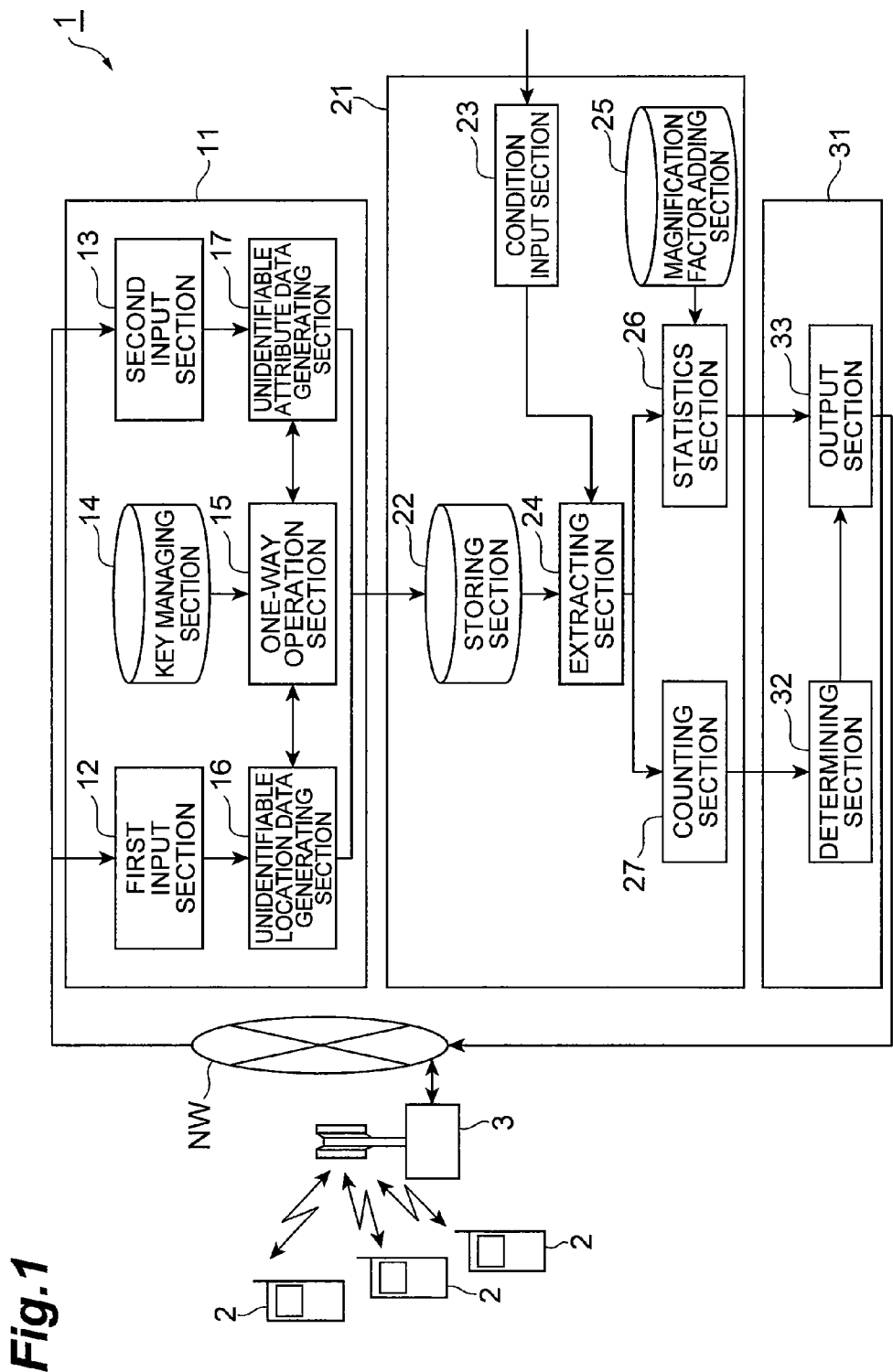
FIG. 1 is a schematic configuration view showing a statistical information generation system in accordance with one preferred embodiment of the present invention.

A preferred embodiment of a statistical information generation system and a statistical information generation method according to the present invention will be described below in detail with reference to the figures. Note that, in description of the figures, the same constituents are given the same reference numerals, and redundant description is omitted.

FIG. 1 is a schematic configuration view showing a statistical information generation system 1 in accordance with one preferred embodiment of the present invention. The statistical information generation system 1 shown in FIG. 1 is a computer system that generates statistical data including an estimated value of the movement of population by use of location information as data for offering a telecommunication service to mobile communication terminals such as a plurality of portable terminals 2 in a mobile communication network NW. The statistical information generation system 1 is constituted by a plurality of information processors including an unidentifiable information generation device 11, a counting device 21, and an information hiding device 31, and is enabled to perform data communication with the portable terminals 2 and communication devices connected to the mobile communication network NW via a radio base station 3 and the mobile communication network NW. The statistical information generation system 1 may include one information processor or may include any number of information processors.

Each portable terminal 2 described above has a function of acquiring its location information according to various positioning operation systems such as positioning by use of the GPS and positioning by use of electric waves from the radio base station 3. Moreover, the location information of the portable terminals 2, which is acquired as a result of the positioning operation, is transmittable from the portable terminals 2 and the communication devices connected to the mobile communication network NW to the statistical information generation system 1.

A configuration of the statistical information generation system 1 will be described below in detail.

The unidentifiable information generation device 11 includes a first input section (first input means) 12, a second input section (second input means) 13, a key managing section (key managing means) 14, a one-way operation section (one-way operation means) 15, an unidentifiable location data generating section (unidentifiable location data generating means) 16, and an unidentifiable attribute data generating section (unidentifiable attribute data generating means) 17.

The first input section 12 receives location information from the outside such as the mobile communication network NW, and stores it in location information-storing data. As shown in FIG. 2, the location information-storing data includes: first identification information "090-XXXX-XXXX" as information for identifying the portable terminal 2, for example, line number; location information "X1 and Y1" as information related to the location of the portable terminal 2, for example, latitude and longitude information or identification information of the radio base station 3 that receives a location registration signal of the portable terminal 2; and time "2010/5/30 12:24" when the location information is acquired. Furthermore, the first input section 12 outputs the stored location information-storing data to the unidentifiable location data generating section 16.

The second input section 13 receives attribute data indicating an attribute of the portable terminal 2 from the outside such as the mobile communication network NW, and stores it in attribute information-storing data. As shown in FIG. 3, the attribute information-storing data includes second identification information "090-XXXX-XXXX" as information for identifying the portable terminal 2, for example, line number, and attribute information indicating the attribute of the subscriber of the portable terminal 2 identified based on the second identification information, that is, when the second identification information is the line number, the attribute of the subscriber of the line. Specific examples of such attribute information include address "Tokyo, Shinjuku-ku", sex "male", age "thirties" as typical examples. Note that, for the same portable terminal 2, the first identification information has the same data value as the second identification information. Moreover, the second input section 13 outputs the stored attribute information-storing data to the unidentifiable attribute data generating section 17.

Referring to FIG. 1 again, the key managing section 14 holds predetermined electronic key information. It is desired that the electronic key information is strictly managed so as not to be leaked to the outside of the key managing means.

The one-way operation section 15 receives the first identification information and the second identification information from the unidentifiable location data generating section 16 and the unidentifiable attribute data generating section 17, respectively, and applies a one-way function to each of the first identification information and the second identification information on the basis of the electronic key information held by the key managing section 14 to output first unidentifiable information and second unidentifiable information, respectively. For example, the one-way operation section 15 uses a hash function such as SHA (Secure Hash Algorithm)-256 as the one-way function, and performs an operation of outputting a hash value of connection between the first identification information or the second identification information and the key information, thereby outputting the first unidentifiable information or the second unidentifiable information.

The unidentifiable location data generating section 16 adds the first unidentifiable information created by deleting the first identification information from the location information-storing data and inputting the first identification information to the one-way operation section 15, to the location information-storing data, thereby generating unidentifiable location information-storing data. Here, it is preferred that the unidentifiable location data generating section 16 performs further data processing treatment, for example, adds suitable noise to the location information to shift location. Moreover, the unidentifiable location data generating section 16 passes the generated unidentifiable location information-storing data to the counting device 21.

The unidentifiable attribute data generating section 17 adds the second unidentifiable information creased by deleting the second identification information from the attribute information-storing data and inputting the second identification information to the one-way operation section 15, to the attribute information-storing data, thereby generating unidentifiable attribute information-storing data. Here, it is preferred that the unidentifiable attribute data generating section 17 generates abstraction attribute information obtained by abstracting the attribute information, and replaces the attribute information with the abstraction attribute information. Examples of such abstraction processing include rounding "age" to "age demographic", deleting details of address, and deleting information including personal identities such as names. Moreover, the unidentifiable attribute data generating section 17 passes the generated unidentifiable attribute information-storing data to the counting device 21.

The counting device 21 of the statistical information generation system 1 includes a storing section 22, a condition input section (condition input means) 23, an extracting section (extracting means) 24, a magnification factor adding section (magnification factor adding means) 25, a statistics section (statistics means) 26, and a counting section (counting means) 27.

The storing section 22 stores the unidentifiable location information-storing data and the unidentifiable attribute information-storing data, which are generated by the unidentifiable information generation device 11.

The condition input section 23 accepts an input of a search condition for the unidentifiable location information-storing data and the unidentifiable attribute information-storing data from a requester of the statistical processing. The search condition may be input directly to the statistical information generation system 1, or may be received via a communication network such as the mobile communication network NW. For example, when the requester attempts to estimate "the number of males who are present in an area A at Time t", the condition input section 23 accepts an input of information corresponding to "time=t, location information∈area A, sex=male" as the search condition. Moreover, the condition input section 23 passes the accepted search condition to the extracting section 24.

The extracting section 24 extracts some data sets corresponding to the search condition passed from the condition input section 23 from among the unidentifiable location information-storing data and the unidentifiable attribute information-storing data stored in the storing section 22. For example, when the above-mentioned search condition is given, the extracting section 24 extracts a set of the unidentifiable location information-storing data, which corresponds to "time=t, location information∈area A" and a set of the unidentifiable attribute information-storing data, which corresponds to "sex=male". Then, the extracting section 24 performs a join operation in relational algebra on the respective extracted data sets by using the first unidentifiable information and the second unidentifiable information as key information. Thereby, the data set can be obtained which is acquired by joining the location information and the attribute information, which corresponds to "time=t, location information∈area A, sex=male".

Here, when a matching rate with the search condition is acquired as a probability value as a result of comparing the search condition with the unidentifiable location information-storing data, the extracting section 24 may add probability information indicating the probability value to the unidentifiable location information-storing data. For example, when whether or not the "location information∈area A" is satisfied is probabilistically given, the probability can be added to the extracted sets. When the attribute information included in the unidentifiable attribute information-storing data is replaced with the abstraction attribute information, the extracting section 24 extracts the unidentifiable attribute information-storing data by comparing the abstraction location information with the search condition. For example, when the abstraction attribute information is set to "age: fifties", the abstraction attribute information is determined to conform to the search condition "age=twenties to fifties".

Based on the attribute information included in the unidentifiable attribute information-storing data joined to the unidentifiable location information-storing data, the magnification factor adding section 25 acquires a magnification factor as a numerical value and adds the magnification factor to the joined data set according to a predetermined procedure. The magnification factor is a factor indicating a degree of magnification to a population value of statistical target. For example, the magnification factor adding section 25 previously holds the subscription ratio of the mobile phone for each combination of age demographic and sex such as "thirties, male" and "twenties, female", and adds the reciprocal of the corresponding subscription ratio to the data set including a certain combination of age and sex as the attribute information, and outputs it. More specifically, when the subscription ratio of "thirties, male" is held as 50% (=0.5), the magnification factor "2.0" as the reciprocal of "0.5" is output to the attribute information "35 years old, male".

The statistics section 26 calculates the statistical data related to estimated population by using the data set obtained by joining the unidentifiable location information-storing data and the unidentifiable attribute information-storing data which are extracted by the extracting section 24, to each other, and magnification factor added by the magnification factor adding section 25. Specifically, the statistics section 26 extracts age and sex from the attribute information for each information included in the data set, and calls the magnification factor adding section 25 to acquire the corresponding magnification factor. Further, the statistics section 26 calculates the total sum of the magnification factors of the all data records (data elements) included in the data set as the estimated number of persons. Here, when the some data records included in the data set are added with the probability information indicating the probability value corresponding to the search condition, the statistics section 26 can calculate the statistical number of persons by taking the total sum of values obtained by multiplying the probability information by the magnification factor. Furthermore, the statistics section 26 also outputs the calculated statistical data to the information hiding device 31.

The counting section 27 counts the number of pieces of data of the data records (data elements) in the data set extracted by the extracting section 24, and outputs the counted value as the counted number of persons to the information hiding device 31. Here, in calculating the counted number of persons, the magnification factor and the probability information are not considered. The reason is as follows: since the information hiding device 31 should determine the necessity or unnecessity of hiding of the statistical data, based on "the information is estimated from the group of how many users of the portable terminals 2", the raw number of data elements before the weighting processing using the magnification factor and the probability information is needed.

The information hiding device 31 of the statistical information generation system 1 includes a determining section (determining means) 32 and an output section (output means) 33.

The determining section 32 compares the number of pieces of data counted by the counting section 27 with a predetermined value to determine the magnitude of the number of pieces of data. For example, when a specific reference value is previously given as "10", the determining section 32 determines whether or not the number of persons, which is counted by the counting section 27, is "10" or larger. When the number of persons is 10 or larger as a result of the determination, the determining section 32 determines that counted number of persons is large, and when the number of persons is less than 10, determines that counted number of persons is small. Then, the determining section 32 passes the determination result to the output section 33.

The output section 33 decides whether or not to directly output the statistical data including the estimated number of persons, which is estimated by the counting device 21, on the basis of the determination result of the determining section 32, and outputs the final statistical data. The statistical data may be output to an output device such as a display device provided directly in the statistical information generation system 1, or may be output to a remote device such as the portable terminal 2 via a communication network such as the mobile communication network NW. Specifically, when it is determined that the counted number of persons is large, the output section 33 directly outputs the estimated number of persons, which is included in the statistical data. On the other hand, when it is determined that the counted number of persons is small, the output section 33 replaces the estimated number of persons with a predetermined value or symbol and outputs it, thereby hiding the estimated number of persons. For example, the estimated number of persons is output as "0", or replaced with a symbol "x" representing the hiding to be output. Even when it is determined that the counted number of persons is large, it is preferred that, in consideration of the possibility of disclosure of a residual value, the estimated number of persons is rounded to an approximate value having a certain numerical interval, or a value obtained by adding a random number is output as the estimated value.

Figure 4:
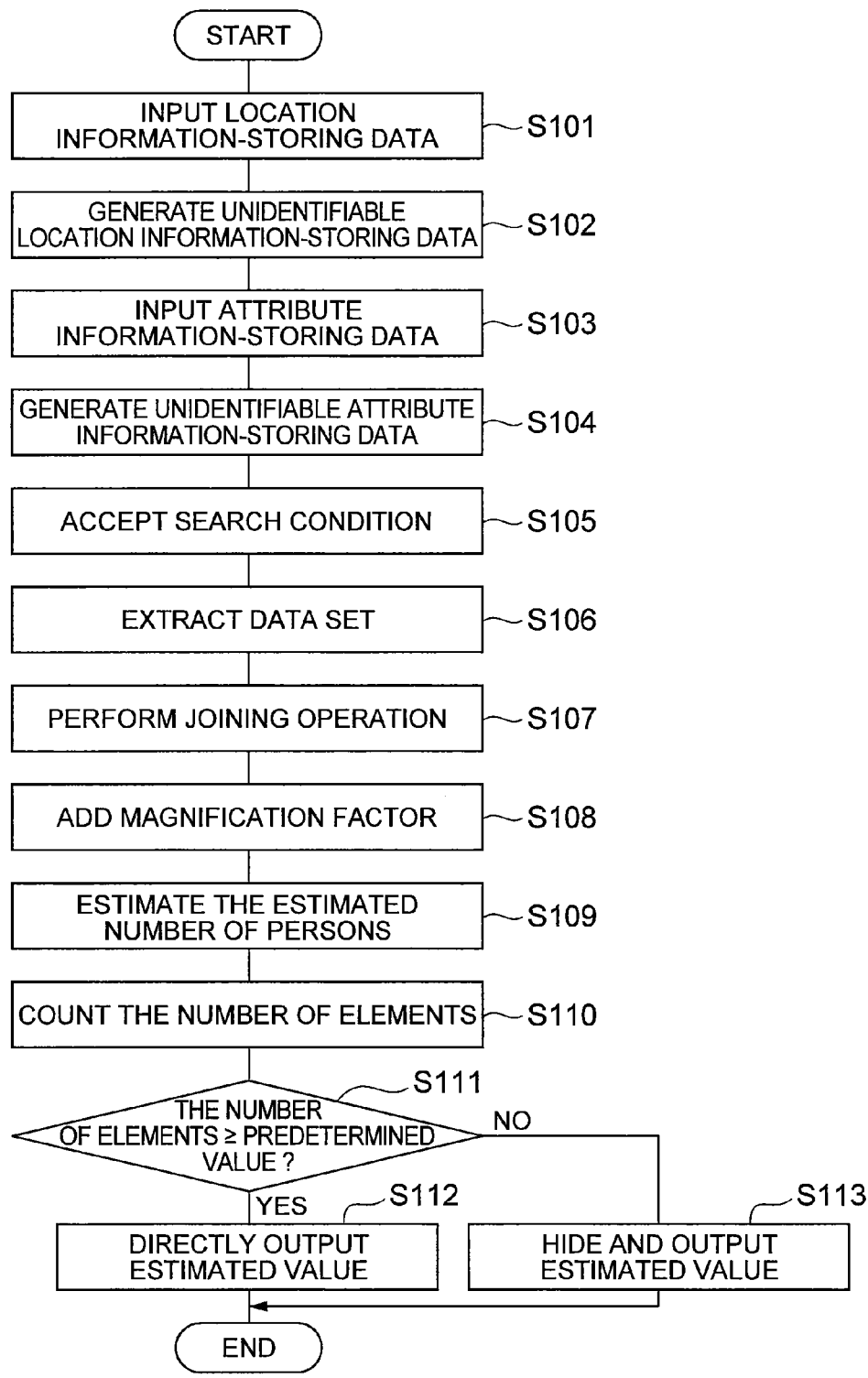
FIG. 4 is a flow chart showing operations of the statistical information generation system in FIG. 1.

Hereinafter, referring to FIG. 4, operations of the statistical information generation system 1 will be described, and a statistical information generation method in the statistical information generation system 1 will be described in detail. FIG. 4 is a flow chart showing operations of the statistical information generation system 1 at generation of statistical information.

First, the unidentifiable information generation device 11 receives inputs of location information, and stores it in location information-storing data (Step S101). Next, the unidentifiable location data generating section 16 of the unidentifiable information generation device 11 deletes the first identification information from the location information-storing data, and adds the first unidentifiable information obtained by inputting it to the one-way operation section 15, to the location information-storing data, thereby generates the unidentifiable location information-storing data, and stores it in the storing section 22 of the counting device 21 (Step S102). After that, the unidentifiable information generation device 11 receives inputs of the attribute information and stores it in the attribute information-storing data (Step S103). Next, the unidentifiable attribute data generating section 17 of the unidentifiable information generation device 11 deletes the second identification information from the attribute information-storing data, and adds the second unidentifiable information obtained by inputting it to the one-way operation section 15, to the attribute information-storing data, thereby generates the unidentifiable attribute information-storing data, and stores it in the storing section 22 of the counting device 21 (Step S104).

Further, the condition input section 23 of the counting device 21 receives input of the search condition for specifying the condition of statistical processing (Step S105). For example, the condition input section 23 receives input of information corresponding to "time=t, location information∈area A, sex=male" as the search condition for estimating "the number of males who are present at the time t in the area A". In response to this, the extracting section 24 extracts a set of the unidentifiable location information-storing data and a set of the unidentifiable attribute information-storing data, which correspond to the received search condition, from the storing section 22 (Step S106). Specifically, the extracting section 24 extracts the set of the unidentifiable location information-storing data corresponding to "time=t, location information∈area A" and the set of the unidentifiable attribute information-storing data corresponding to "sex=male" from the storing section 22, respectively. Further, the extracting section 24 performs a joining operation on the respective extracted sets by using the first unidentifiable information and the second unidentifiable information as keys (Step S107). As a result, the extracting section 24 acquires the data set corresponding to the search condition.

Next, the statistics section 26 extracts a part of the attribute information, for example, age and sex, from components of the data set extracted by the extracting section 24 and gives the part to the magnification factor adding section 25, thereby acquiring the magnification factor for each component (Step S108). After that, the statistics section 26 calculates the total sum of the magnification factors to acquire the estimated number of persons (Step S109). Further, the counting section 27 calculates the number of elements of the data set extracted by the extracting section 24 to acquire the counted number of persons (Step S110).

It is assumed that the extracting section 24 acquires a data set constituted by four data elements each including data items "location, time, age, sex" as shown below.

Element 1: (A, t, 23, male)
Element 2: (A, t, 33, male)
Element 3: (A, t, 31, male)
Element 4: (A, t, 85, male)

Here, it is assumed that the magnification factor adding section 25 holds the following information as the subscription ratio for a pair of age demographic and sex.

(twenties, male): 40% (=0.4)
(thirties, male): 50% (=0.5)
(eighties, male): 5% (=0.05)

In this case, given that the magnification factor is a reciprocal of the subscription ratio, the following magnification factors are added to respective elements.

Element 1: (A, t, 23, male): 2.5
Element 2: (A, t, 33, male): 2.0
Element 3: (A, t, 31, male): 2.0
Element 4: (A, t, 85, male): 20.0

Further, in the above-mentioned example, the estimated number of persons, which is estimated by the statistics section 26, is "26.5", and the counted number of persons, which is calculated by the counting section 27, is "4".

Referring to FIG. 4 again, after that, the determining section 32 of the information hiding device 31 determines whether or not the counted number of persons, which is calculated by the counting section 27, is a predetermined value or larger (Step S111). Given that a specific reference value is set to "10", since the counted number of persons is "4" in the above-mentioned example, the counted number of persons is determined to be small.

Finally, the output section 33 decides whether or not to directly output the estimated number of persons based on the determination of the determining section 32, and outputs the final estimated value. That is, when the estimated number of persons is determined to be large (Step S111; YES), the output section 33 directly outputs the estimated number of persons as the estimated value (Step S112). On the other hand, when the estimated number of persons is determined to be small (Step S111; NO), the estimated number of persons is replaced with a predetermined particular value or symbol, and thus the estimated number of persons is hidden and output (Step S113). In the above-mentioned example, since the counted number of persons is determined to be small, the estimated value is output as "0", for example.

According to the above-described statistical information generation system 1 and statistical information generation method, after the first and second identification information is deleted from the location information-storing data and the attribute information-storing data, which are associated with each other based on the first and second identification information, the first and second unidentifiable information is added. The first and second unidentifiable information is acquired by substituting the previously held electronic key information and the first and second identification information into a one-way function, and the identification information cannot be calculated backward from the unidentifiable information. In addition, even if the one-way function is known, as long as a value of the electronic key is kept secret, even if the identification information is input to the one-way function in a round robin, it is not able to know correspondence relation between the identification information and the unidentifiable information.

Further, based on the search condition, the demographic data taking the degree of magnification to the value of the statistical target is calculated from the unidentifiable location information-storing data and the unidentifiable attribute information-storing data, to which the unidentifiable information is added. Here, since the identification information is replaced with the unidentifiable information, the statistical processing that allows disclosure of behavior of any particular person can be prevented by giving the search condition using the identification information. Further, information to be a material for determining the necessity or unnecessity of hiding of the statistical data is provided by counting the estimated data as the estimated population value taking the subscription ratio of the portable terminals according to the attribute into consideration, as well as the number of pieces of data as the actual number of pieces of location data used to generate the estimated value.

Moreover, it is determined whether or not the estimated statistical data is information generated from "a small group" on the basis of the number of pieces of data thus counted, and the statistical data is hidden based on the determination result. It cannot be determined whether or not the estimated statistical data is information generated from "a small group" from only the statistical value in the statistical data. This is due to that the statistical value is derived from expansion estimation based on the subscription ratio of the portable terminals, which varies according to attribute. Thus, by using the above-mentioned counted number of pieces of data, it is accurately determined whether or not the counted data is generated from "a small group".

As a result, any person can be prevented from being identified based on the identification information included in the location information-storing data and the attribute information-storing data, and the personal identities in the estimated statistical data can be hidden.

In the statistical information generation system 1, the attribute information included in the attribute information-storing data is replaced with the abstraction attribute information obtained by abstracting information, the abstraction attribute information is compared with the search condition information, and thereby a part of the unidentifiable attribute information-storing data is extracted. Accordingly, by acquiring the statistical data in units of the abstracted attribute information, summary of the movement of population can be known. Moreover, by making the statistical data schematic, it may become more difficult to identify any person on the basis of the statistical data.

Furthermore, since the statistical data is calculated by adding the probability information to the unidentifiable location information-storing data and multiplying the probability information by the magnification factor, when the matching rate between the location information and the search condition is acquired as the probability, the statistical data reflecting the probability can be obtained, and thereby the statistical data reflecting the entire tendency of the movement of population can be obtained. For example, when the location information is acquired as a probability distribution in each area, the statistical data reflecting the probability distribution can be obtained.

It is noted that the present invention is not limited to the above-mentioned embodiment. For example, the location information-storing data and the attribute information-storing data, which are processed in the statistical information generation system 1, include line numbers as the first and second identification information, and the statistical information generation system 1 uses the line numbers as information for identifying the portable terminals 2. Alternatively, the statistical information generation system 1 may process numbers for identifying the users of the portable terminals 2, such as IMSI (International Mobile Subscriber Identity) and numbers for identifying devices of the portable terminals 2, such as IMEI (International Mobile Equipment Identity), as the information for identifying the portable terminals 2, in place of the line numbers.

Moreover, the extracting section 24 of the counting device 21 extracts some data sets corresponding to the search condition from among the unidentifiable location information-storing data and the unidentifiable attribute information-storing data, which are stored in the storing section 22. After the extracting section 24 joins the unidentifiable location information-storing data and the unidentifiable attribute information-storing data to each other according to the joining operation, the probability information may be added to the joined data sets, and some data sets corresponding to the search condition may be extracted from the joined data sets. In addition, the data set prior to addition of the probability information may be extracted, or the data set to which the magnification factor is added by the magnification factor adding section 25 may be extracted.

Furthermore, although the statistics section 26 of the counting device 21 calculates the total sum of the magnification factors of the data records included in the data set extracted by the extracting section 24, the total sum of the data records included in the data set may be calculated for each attribute, and the total sum may be multiplied by the magnification factor corresponding to the concerned attribute. For example, the statistical number of persons corresponding to the attribute "thirties, male", first, by calculating the total number of the data records or the total sum of the probability values of the data records, which corresponds to the attribute "thirties, male" included in the data set, and then multiplying the total number or total sum by the magnification factor of "2.0" corresponding to the attribute "thirties, male".

Moreover, in the above-mentioned embodiment, on the basis of the search condition input of which is received by the condition input section 23 of the counting device 21, the output section 33 of the information hiding device 31 outputs the overall statistical number of persons corresponding to the search condition. However, the statistical number of persons may be divided and output according to an attribute. For example, when the search condition is received as information, "time=t, location information=area A, age=thirties", the output section 33 may output the statistical number of persons for each sex, may output the statistical number of persons for each age, and may output the statistical number of persons for each combination of age and sex.

Furthermore, in the counting device 21, according to the following procedure, the extracting section 24 may add an amount of feature $w_{ij}$ as information corresponding to an estimated generation density of the location information generated by the portable terminals 2 to data obtained by joining the location information and the attribute information (hereinafter referred to as merely "location data"), and the statistics section 26 may count a set of the location data to estimate the number of terminals in a serving zone. The "estimated generation density" used herein means an estimated value of the number of signals that the terminal generating the location information generates around a generating time of the location information per unit time.

Figure 5:
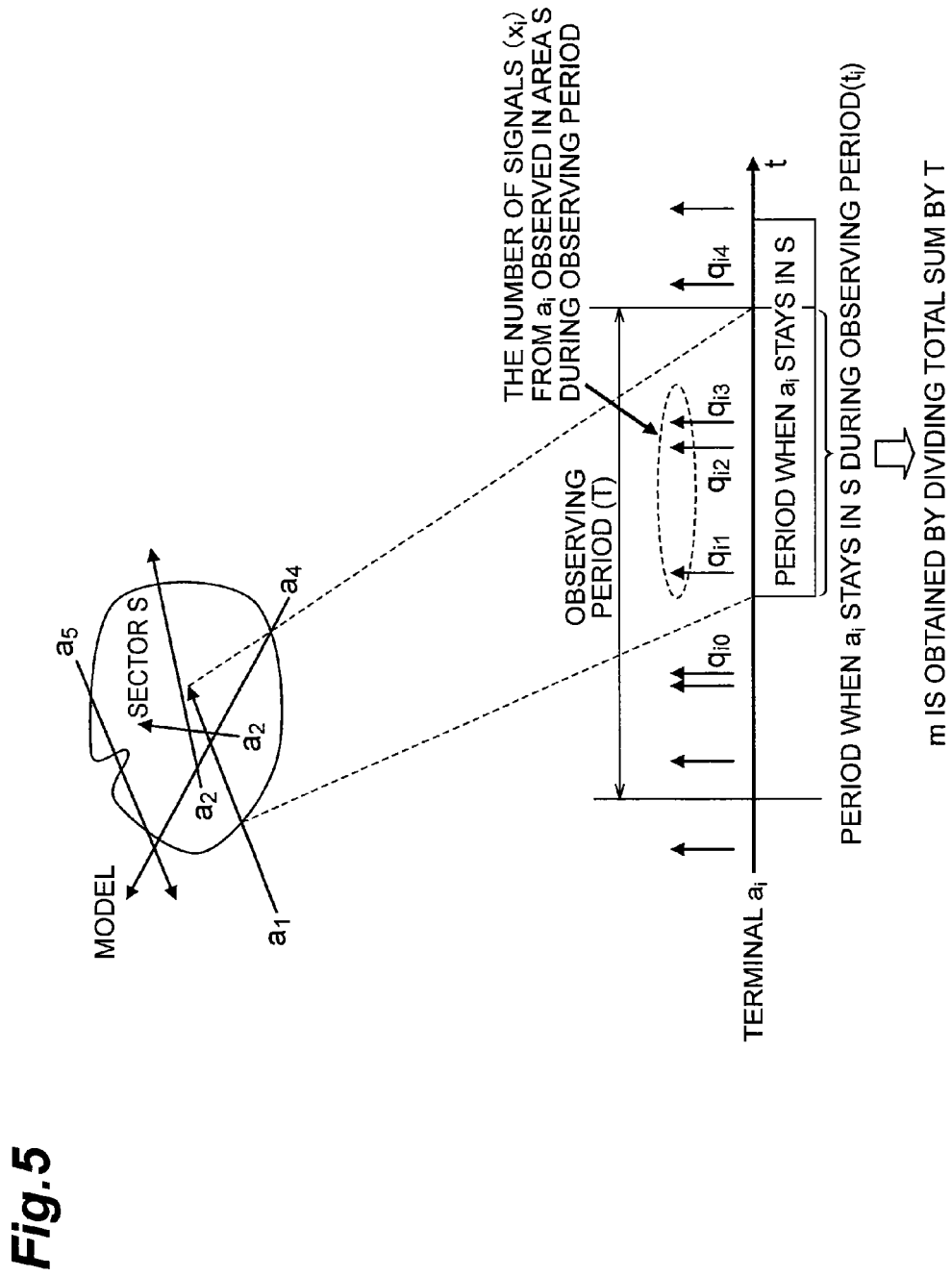
FIG. 5 is a view for explaining a concept of estimation of the number of terminals in this embodiment.

First, the concept of estimation of the number of terminals and a calculation method of it will be described. As shown in a model in FIG. 5, it is assumed that n terminals $a_1, a_2, \ldots, a_n$ pass a sector S of the radio base station 3 during a certain observing period (length T), and a stay period of each terminal $a_i$ in the sector S during the observing period is $t_i$ ($0 < t_i \leq T$). At this time, the number of terminals m existing in the sector S (actually, an average value of the number of terminals m existing in the sector S during the observing period) is expressed by the following Expression (1).

[Formula 1]

$$m = \sum_{i=1}^{n} t_i / T \tag{1}$$

That is, a value obtained by dividing the total sum of the stay period $t_i$ of each terminal $a_i$ in the sector S during the observing period by the length T of the observing period is estimated as the number of terminals m. However, a true value of the stay period $t_i$ of each terminal $a_i$ in the sector S during the observing period cannot be observed, but each terminal $a_i$ transmits the location information (for example, the location registration signal and hereinafter referred to as merely "signal") and the signal can be observed.

Given that signals transmitted from the terminal $a_i$ in the sector S during the observing period in order of time are $$q_{i1}, q_{i2}, \ldots, q_{ix_i} \quad \text{[Formula 2]}$$

($x_i$ is the total number of signals transmitted from the terminal $a_i$ in the sector S during the observing period), estimation of the number of terminals is neither more nor less than estimation of the value of m on the basis of the observed signal $q_{ij}$ (j is an integer not less than 1 and not more than $x_i$).

Figure 6:
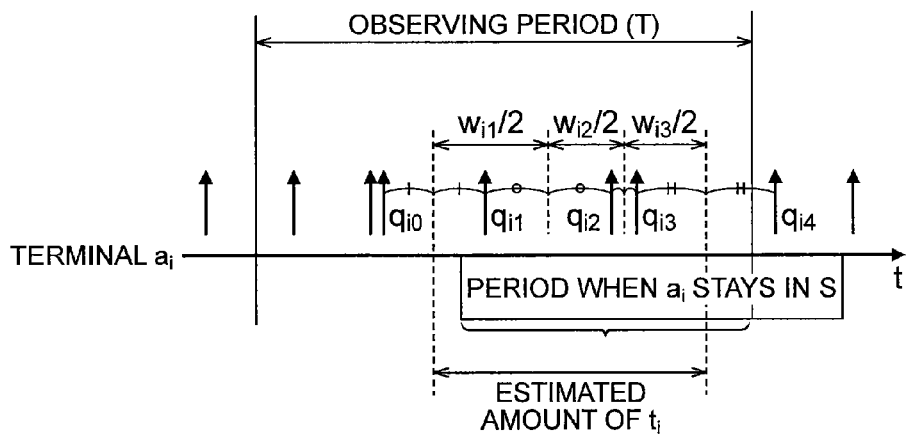
FIG. 6 is a view for explaining a calculation method in accordance with estimation of the number of terminals in this embodiment.

Referring to FIG. 6, a calculation method of estimating the number of terminals will be described. The density in which the terminal $a_i$ transmits the signal $q_{ij}$ (that is, the number of signals per unit time) is defined as $p_i$. At this time, when the probability of transmitting the signal is independent from the sector, since an expected value $E(x_i)$ of the total number $x_i$ of signals transmitted from the terminal $a_i$ in the sector S during the observing period is $t_i \times p_i$, the expected value $E(t_i)$ of the stay period $t_i$ of the terminal $a_i$ in the sector S during the observing period satisfies the following Expression (2).

$$E(t_i) = x_i / p_i \quad (2)$$

Here, given that a transmission time of the signal $q_{ij}$ is $u_{ij}$, a density $p_{ij}$ of the signal $q_{ij}$ is given by the following Expression (3).

$$p_{ij} = 2/(u_{i(j+1)} - u_{i(j-1)}) \quad (3)$$

Here, given that the signal $q_{ij}$ is a signal according to the location data (first location data) of a target, the amount of feature $w_{ij}$ of which is to be found, the signal $q_{i(j-1)}$ corresponds to a signal according to the location data (second location data) immediately before the first location data out of the location data including the same identification information as the first location data, and the signal $q_{i(j+1)}$ corresponds to a signal according to the location data (third location data) immediately after the first location data out of the location data including the same identification information as the first location data. In this embodiment, a difference between the transmission time $u_{i(j-1)}$ of the signal $q_{i(j-1)}$ according to the second location data and the transmission time $u_{i(j+1)}$ of the signal $q_{i(j+1)}$ according to the third location data, that is, ($u_{i(j+1)} - u_{i(j-1)}$) in Expression (3) is defined as the amount of feature $w_{ij}$ of the first location data. For this reason, Expression (3) is as follows. That is, the amount of feature $w_{ij}$ can be calculated in association with the reciprocal of the density $p_{ij}$.

$$p_{ij} = 2/(u_{i(j+1)} - u_{i(j-1)}) = 2/w_{ij} \quad (4)$$

The extracting section 24 of the counting device 21 adds the amount of feature $w_{ij}$ to all location data of the counting target.

At this time, since the density $p_i$ is given by

[Formula 3]

$$p_i = x_i / E(t_i) = \left( x_i \Big/ \sum_{j=1}^{x_i} w_{ij} \right) \times 2, \quad (5)$$

the estimated value E (m) of the number of terminals m can be calculated by the following Expression (6).

[Formula 4]

$$E(m) = \left( \sum_{i=1}^{n} \sum_{j=1}^{x_i} w_{ij}(w_{ij}/2) \right) \Big/ T = \left( \sum_{i=1}^{n} \sum_{j=1}^{x_i} w_{ij} \right) \Big/ 2T \quad (6)$$

As shown in an example in FIG. 6, given that the terminal $a_i$ transmits the signals $q_{i1}$, $q_{i2}$ and $q_{i3}$ in a period when the terminal $a_i$ stays in the sector S during the observing period, the signal $q_{i0}$ is transmitted immediately before the signal $q_{i1}$, the signal $q_{i4}$ is transmitted immediately after the signal $q_{i3}$, and transmission times of the signals $q_{i0}$, $q_{i1}$, $q_{i2}$ $q_{i3}$, and $q_{i4}$ are $u_{i0}$, $u_{i1}$, $u_{i2}$, $u_{i3}$ and $u_{i4}$, respectively, the above-mentioned estimation concept means that the stay period $t_i$ of the terminal $a_i$ in the sector S during the observing period corresponds to a period from (midpoint of $u_{i0}$ and $u_{i1}$) to (midpoint of $u_{i3}$ and ui4).

According to the above-mentioned concept, the statistics section 26 of the counting device 21 specifies the amount of features $w_{ij}$ added to all location data included in the data set, and estimates a value obtained by dividing the total sum of the amount of features $u_{ij}$ by twice of the length T of the observing period as the number of terminals for each sector S and each attribute. Then, the statistics section 26 multiplies the number of terminals thus estimated by the magnification factor to calculate the estimated number of terminals for each sector S and each attribute. Note that, as apparent from Expression (6), the statistics section 26 may divide each amount of feature $w_{ij}$ of the location data to be observed by two and calculate the total sum of (amounts of feature $w_{ij}/2$), and estimate a value obtained by dividing the total sum by the length T of the observing period as the number of terminals. However, in the calculating method of dividing the total sum of the amounts of feature $w_{ij}$ of the location data to be observed by twice of the length T of the observing period as in this embodiment, the number of times of division is extremely small and thus, processing load can be advantageously reduced. Further, in calculating the estimated number of terminals, the statistics section 26 may find the total sum of the amounts of feature $w_{ij}$ by which the magnification factor is multiplied for each attribute, and estimate a value obtained by dividing the found total sum by twice of the length T of the observing period as the estimated number of terminals for each sector S and each attribute. Further, the statistics section 26 may convert the estimated number of terminals for each sector S into the estimated number of persons for each other area segment such as mesh (area conversion) to calculate the statistical data.

As an example of a method of the area conversion, for example, when the estimated number of persons such as the estimated number of terminals has been calculated for each sector S, proportional distribution of a plurality of area segments such as meshes, and cities, towns, and villages for each sector is previously managed. Then, the statistics section 26 proportionally divides the estimated number of persons estimated for each mesh into the plurality of area segments according to the proportional distribution, and sums the estimated number of persons proportionally divided for each area segment, thereby converting the estimated number of terminals into the estimated number of persons for each area segment.

According to the following procedure, the counting device 21 may estimate "the number of visiting terminals" as the unique number of terminals staying in the observing area during at least a part of the observing period, or "the number of visitors" as the unique number of persons staying in the observing area during at least a part of the observing period, for the location data obtained by joining the location information and the attribute information.

Here, referring to FIG. 7, processing of estimating the number of visiting terminals according to the method of estimating the number of visiting terminals of the present invention will be described. Here, it is assumed that to the location information included in the location data of a portable terminal, a sector number of the sector that serves the portable terminal is given. Further, it is assumed that as observing period information, a pair of an observation start time $t_0$ and an observation end time $t_1$ is previously acquired by the condition input section 23, and as observing area information, a sector number S is previously acquired by the condition input section 23.

First, the extracting section 24 extracts the terminal estimated to stay in the observing area during at least a part of the observing period or one piece of location data generated by the terminal during the observing period or a below-mentioned extension period, from the location data stored in the storing section 22. Although various extracting methods can be adopted, a method using an estimated staying period of each terminal in the observing area will be described below as an example.

For the location data of the same terminal, the extracting section 24 calculates the estimated staying period when the terminal stays in the observing area for each terminal on the basis of in-area location data having the acquisition time in the below-mentioned extension period and the location information indicating the terminal inside the observing area and out-of-area location data that is adjacent to the in-area location data in time series in the order of acquisition time and has the location information indicating the terminal outside the observing area (Step S1 in FIG. 7). Note that, the "extension period" means, as an example, a period extended from the observing period to both sides by a predetermined time width (for example, 1 hour), that is, a period having a time going back from the observation start time $t_0$ by the predetermined time as a start point and a time advancing from the observation end time $t_1$ by the predetermined time as an end point.

Figure 8:
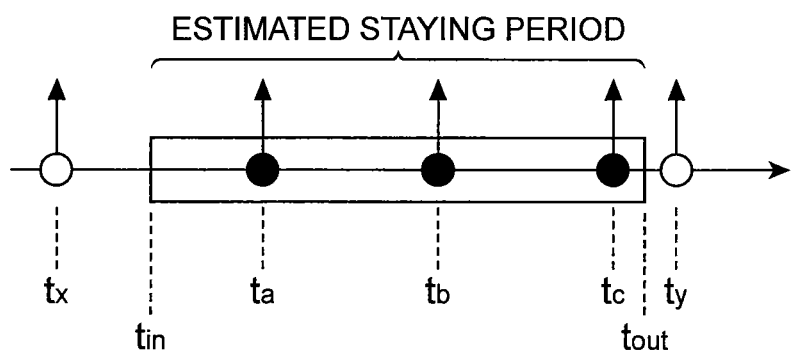
FIG. 8 is a view for explaining a method of calculating an estimated staying period in this embodiment.

As shown in FIG. 8, when a series of pieces of location data about the same terminal, which are acquired in the extension period, are aligned in time series in the order of acquisition time, the pieces of in-area location data having the location information indicating the terminal inside the observing area are expressed as black circles, and the pieces of out-of-area location data that are adjacent to the in-area location data and have the location information indicating the terminal outside the observing area are expressed as white circles, respectively, time $t_{in}$ corresponding to a proportional point (for example, midpoint) of an acquisition time $t_a$ of the earliest in-area location data and an acquisition time $t_x$ of the out-of-area location data adjacent to the earliest in-area location data is defined as a start time of the estimated staying period in time series. Similarly, time $t_{out}$ corresponding to a proportional point (for example, midpoint) of an acquisition time $t_c$ of the latest in-area location data and an acquisition time $t_y$ of the out-of-area location data adjacent to the latest in-area location data is defined as an end time of the estimated staying period in time series. Thereby, a period represented as a rectangle in FIG. 8, that is, a period from time $t_{in}$ to time $t_{out}$ is calculated as the estimated staying period of the terminal.

Figure 7:
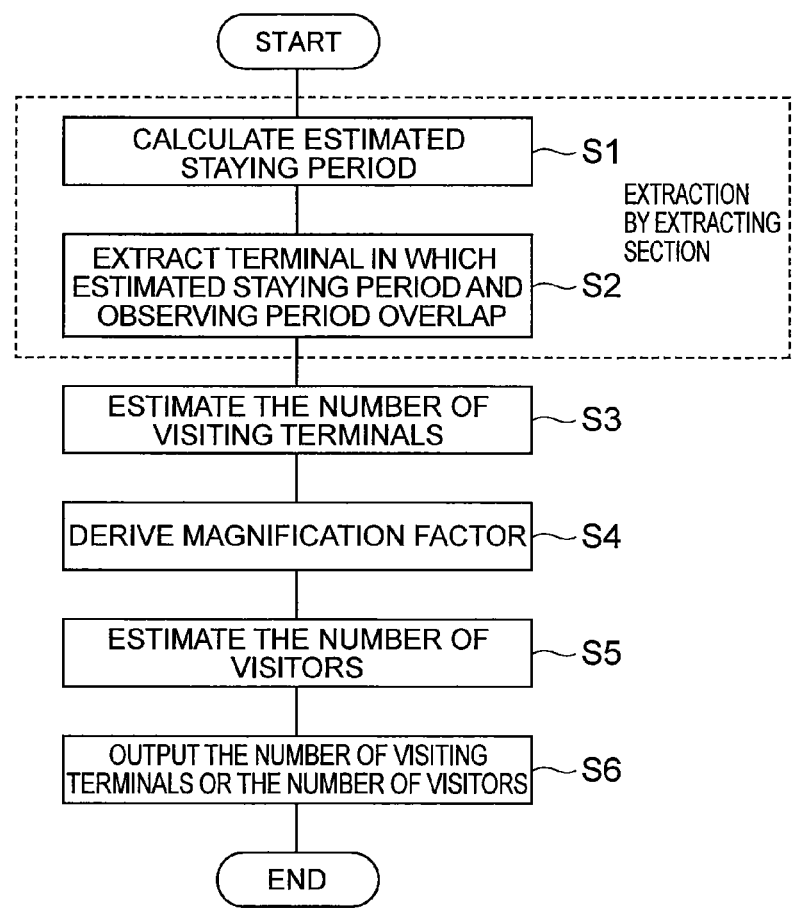
FIG. 7 is a flow chart showing processing of estimating the number of visiting terminals in this embodiment.
Figure 9:
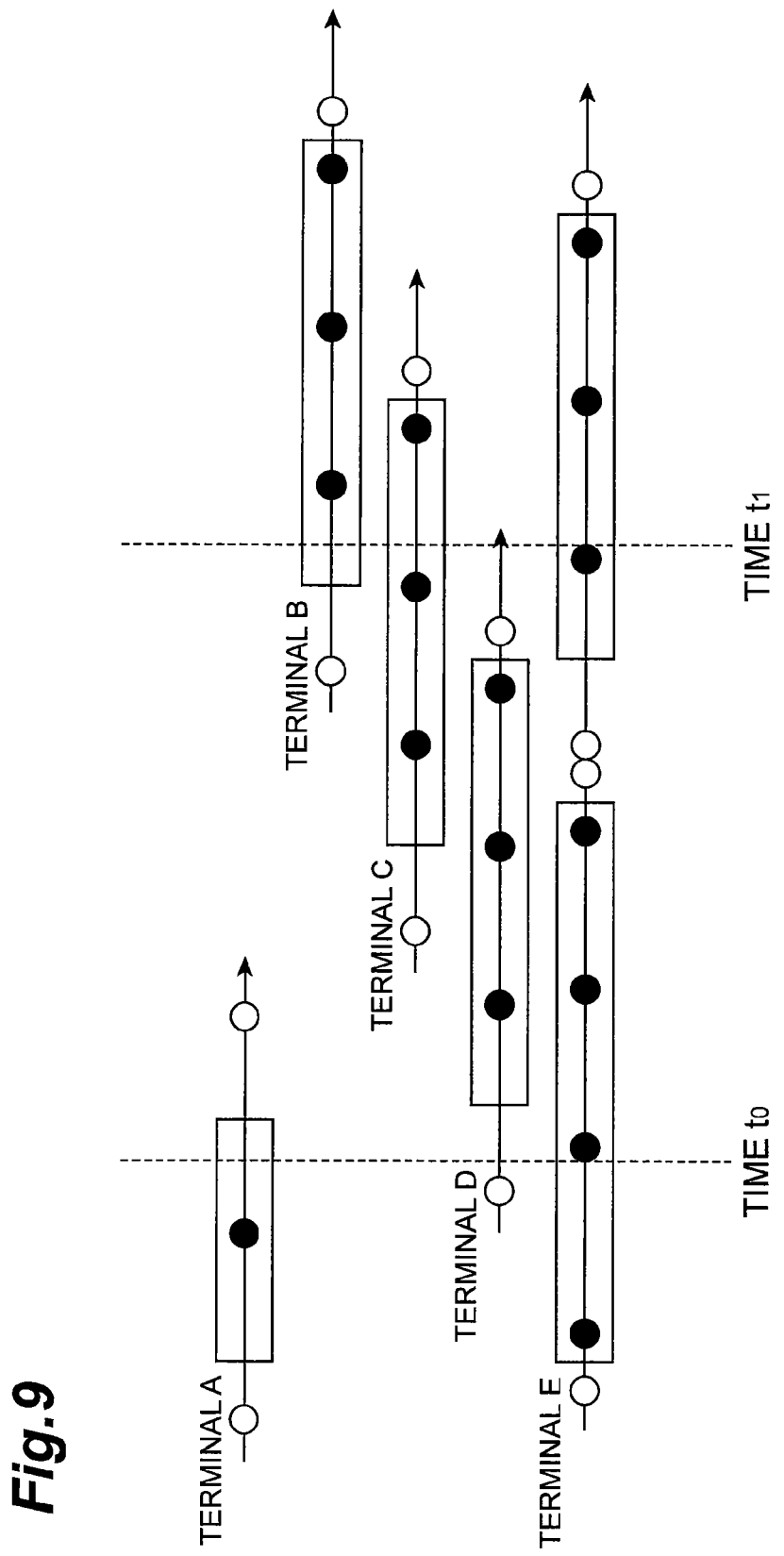
FIG. 9 is a view for explaining a method of extracting location data in this embodiment.

Then, the extracting section 24 extracts terminals, the calculated estimated staying period and the observing period of which overlap (Step S2 in FIG. 7). FIG. 9 is a view showing a series of pieces of location data about each of terminals A to E acquired in the extension period are aligned in time series in the order of acquisition time in a direction of a horizontal axis, and in FIG. 9, the pieces of the in-area location data having the location information indicating the terminal inside the observing area are expressed by black circles, and the pieces of the out-of-area location data having the location information indicating the terminal outside the observing area are expressed by white circles. Noting only the in-area location data having the acquisition time in the observing period (time $t_0$ to time $t_1$), the three terminals C to E are extracted as the corresponding terminals.

However, since the five terminals A to E are enumerated as the terminals, the estimated staying period represented as rectangles in FIG. 9 and the observing period (time $t_0$ to time $t_1$) of which overlap, the terminals A to E are extracted in Step S2. Thus, even the terminals A, B excepted when noting only the in-area location data expressed as the black circles are estimated to stay in the observing area during the observing period. The above-mentioned method using the estimated staying period in Steps S1 and S2 is merely an example, and other methods may be adopted. The other methods will be described later.

Next, the statistics section 26 counts the number of terminals extracted in Steps S1 and S2, and estimates the count as the number of visiting terminals in the observing area during the observing period (Step S3 in FIG. 7).

Subsequently, the magnification factor adding section 25 derives the magnification factor for converting the number of visiting terminals to the number of visitors for each extracted terminal on the basis of the corresponding attribute information (Step S4 in FIG. 7). Moreover, when the magnification factor such as the terminal subscription ratio varies according to time, the magnification factor adding section 25 preferably extracts a leading time of a period when the estimated staying period and the observing period overlap, and derives the magnification factor corresponding to the acquired leading time.

Next, the statistics section 26 calculates the magnification factor of the location data of each terminal, which is derived by the magnification factor adding section 25, and estimates the total sum of the acquired magnification factors as the number of visitors in the observing area during the observing period (Step S5 in FIG. 7). Then, statistics section 26 outputs the estimated number of visitors to the information hiding device 31 (Step S6 in FIG. 7). At this time, the number of visiting terminals, which is acquired in Step S3, may be also output.

In the above-mentioned embodiment, the magnification factor adding section 25 adds the reciprocal of the subscription ratio corresponding to the attribute information as the magnification factor, but may add the magnification factor reflecting a staying ratio in a serving zone of the terminal. For example, the magnification factor adding section 25 can use the reciprocal of the "terminal subscription ratio" as the ratio of "the number of subscribed terminals of a particular telecommunication carrier from which the location data can be acquired" to "population in an area in a predetermined range", as the magnification factor reflecting the staying ratio in a serving zone. The "number of subscribed terminals of a particular telecommunication carrier from which the location data can be acquired" can be counted from the location data stored in the storing section 22. Such magnification factor can be calculated according to each address segment, age demographic, sex, and time zone.

Furthermore, the hiding processing of the information hiding device 31 may be performed as follows.

Figure 10:
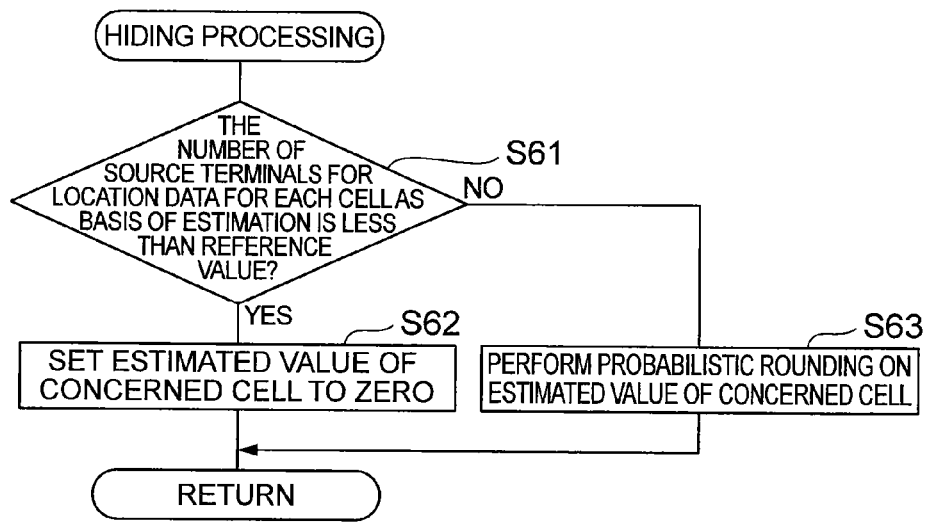
FIG. 10 is a flow chart showing an example of hiding processing in this embodiment.

When receiving the estimated value (for example, estimated population) from the statistics section 26, the information hiding device 31 performs hiding processing shown in FIG. 10, for example. That is, the determining section 32 determines whether or not the number of source terminals, which indicates the number of terminals from which the location data for each area (cell) as a basis for estimation is acquired, is less than a predetermined reference value (for example, 10) for determining the necessity of the hiding processing (Step S61 in FIG. 10). Note that, the number of source terminals refers to the unique number of terminals except for the same overlapping terminal. To make such determination, the number of source terminals for the location data for each area (cell) is required. As an example, when the statistics section 26 counts the amounts of feature associated with the location data, the counting section 27 may count the number of pieces of the identification information (for example, hashed telephone numbers after the non-identification processing of the unidentifiable location data generating section 16) in the location data, and pass information on the total number of the hashed telephone numbers to the determining section 32, and the determining section 32 may uses the total number of the hashed telephone numbers as the number of source terminals for the location data for each area (cell).

More specifically, when the statistics section 26 performs area conversion from the sector S to area segments, the determining section 32 determines the number of source terminals for the location data for each area segment, which is counted by the counting section 27. For example, it is assumed that, when a certain area segment Q covers the sector SA and the sector SB, during the observing period of the counting target, the location registration signals from the six portable terminals 2 having respective terminal identification numbers: ID1, ID2, ID3, ID4, ID5 and ID6 are observed in the sector SA, and the location registration signals from the five portable terminals 2 having respective terminal identification numbers: ID4, ID5, ID6, ID7 and ID8 are observed in the sector SB. In such case, determination of the determining section 32 is made using the number of source terminals, which indicates the number of terminals from which the location data for the area segment Q as a basis for estimation is acquired, rather than using the total sum of the number of source terminals for the each of sectors SA, SB. In the above-mentioned example, the unique number of terminals in the sector SA is six, and the unique number of terminals in the sector SB is five. However, the number of source terminals, which is determined by the determining section 32, is the number of source terminals, which is calculated for the area segment Q, that is, eight. If the reference value is 10, the number of source terminals is less than the reference value and thus, the determining section 32 targets the estimated value of the area segment Q for hiding.

When the number of source terminals for the location data for each area (cell) as a basis for estimation is less than the reference value in Step S61, the output section 33 sets the estimated value for the area (cell) to zero, thereby hiding the estimated value (Step S62). Note that, the hiding method is not limited to setting the estimated value to zero, and other methods such as a method of representing the estimated value as a predetermined character or symbol (for example, "X") may be adopted.

On the other hand, when the number of source terminals for the location data for each area (cell) as a basis for estimation is the reference value or larger in Step S61, the output section 33 performs probabilistic rounding of the class width used to output the estimated value with respect to the estimated value for the area (cell) as follows (Step S63). That is, given that the estimated value for a certain area (cell) is x, and a class width is k, in the case of $kn \leq x < k(n+1)$ (n is an integer), the output section 33 rounds the estimated value x to $k(n+1)$ with the probability $(x-kn)/k$, and to kn with the probability $(k(n+1)-x)/k$.

For example, in the case of the estimated value x of 23 and the class width k of 10, n equals 2 according to $k \times 2 \leq x < k(2+1)$, and the estimated value "23" is rounded to "30" with the probability of 0.3 (probability of 30%) and to "20" with the probability of 0.7 (probability of 70%).

According to the hiding processing of the information hiding device 31, any person can be prevented from being identified based on the estimation result to improve the usability of the estimation result. Moreover, the disadvantage that the hidden value can be guessed from other values can be prevented.

Note that, the class width in the probabilistic rounding may be set by extracting the largest magnification factors from magnification factors of the location data used in counting and by multiplying the magnification factor by a predetermined value (for example, 10). Moreover, the class width may be predetermined to perform the probabilistic rounding. In this case, a processing rule of excluding data for the area (cell) including the location data, the magnification factor of which exceeds a predetermined proportion (for example, 1/10) of a predetermined class width may be adopted.

In addition, the hiding processing of the information hiding device 31 is not limited to the processing shown in FIG. 10 and may be any other processing. For example, in Step S61 in FIG. 10, it may be determined whether or not, in place of "the number of source terminals for the location data for each area (cell) as a basis for estimation", "the number of pieces of the location data for each area (cell) as a basis for estimation" is less than the reference value, or whether or not the "output estimated value (population or the number of terminals)" is less than the reference value. Furthermore, when the determination result of Step S61 in FIG. 10 is NO, the processing in Step S63 may be omitted.

It is preferred that the statistical information generation system further includes a key managing means that holds a predetermined electronic key information; a one-way operation means that receives the first identification information and the second identification information, and applies a one-way function using the electronic key information held by the key managing means to each of the first identification information and the second identification information to output the first unidentifiable information and the second unidentifiable information; an unidentifiable location data generating means that deletes the first identification information from the location information-storing data, and adds the first unidentifiable information output from the one-way operation means as the first identification information to the location information-storing data to generate location information-storing data; and an unidentifiable attribute data generating means that deletes the second identification information from the attribute information-storing data, and adds the second unidentifiable information output from the one-way operation means as the second identification information to the attribute information-storing data to generate attribute information-storing data. In this case, the first identification information and second identification information are deleted from the location information-storing data and the attribute information-storing data, which are associated with each other by the first and second identification information, respectively, and then, the first unidentifiable information and second unidentifiable information are added. The first and second unidentifiable information is obtained by substituting the previously held electronic key information and the first and second identification information into the one-way function, and the identification information cannot be calculated backward from the unidentifiable information. Moreover, even if the one-way function is known, as long as a value of the electronic key is kept secret, even when the identification information is input to the one-way function by round robin, it is not able to know correspondence relation between the identification information and the unidentifiable information. As a result, any person can be prevented from being identified based on the identification information included in the location information-storing data and the attribute information-storing data. Further, since the identification information is replaced with the unidentifiable information, the statistical processing that allows disclosure of behavior of any particular person by setting the search condition using the identification information can be prevented from occurring.

Furthermore, it is preferred that the unidentifiable attribute data generating means replaces the attribute information included in the attribute information-storing data with the abstraction attribute information obtained by abstracting information, and the extracting means compares the abstracted abstraction attribute information with the search condition information, thereby extracting a part of the unidentifiable attribute information-storing data. In this manner, summary of the movement of population can be known by acquiring the statistical data in units of the abstracted attribute information, and personal identification based on the statistical data can be made more difficult.

In addition, it is preferred that the extracting means adds probability information indicating a matching rate with the search condition information to the location information-storing data, and the statistics means calculates the statistical data by multiplying the probability information added to the location information-storing data by the magnification factor. With such configuration, when the matching rate between the location information and the search condition is acquired as probability, the statistical data reflecting the probability can be obtained and thus, the statistical data reflecting the entire tendency of the movement of population can be obtained.

Moreover, it is preferred that the extracting means estimates a value corresponding to an estimated generation density of the location information generated by the mobile communication terminal on the basis of the location information-storing data, and adds the value as an amount of feature to the location information-storing data, and the statistics means calculates the statistical data by multiplying the amount of feature added to the location information-storing data by the magnification factor. With such configuration, the stay period in the sector can be estimated and the statistical data reflecting the stay period can be obtained, resulting in that the statistical data reflecting the entire tendency of the movement of population can be obtained.

INDUSTRIAL APPLICABILITY

According to the present invention, even when the present invention is applied to a location information counting device and a location information counting method, and a positioning method causing various errors is used, highly accurate population distribution with less error can be calculated.

REFERENCE SIGNS LIST

1: statistical information generation system, 2: portable terminal (mobile communication terminal), 11: unidentifiable information generation device, 12: first input section (first input means), 13: second input section (second input means), 14: key managing section (key managing means), 15: one-way operation section (one-way operation means), 16: unidentifiable location data generating section (unidentifiable location data generating means), 17: unidentifiable attribute data generating section (unidentifiable attribute data generating means), 21: counting device, 23: condition input section (condition input means), 24: extracting section (extracting means), 25: magnification factor adding section (magnification factor adding means), 26: statistics section (statistics means), 27: counting section (counting means), 31: information hiding device, 32: determining section (determining means), 33: output section (output means).

The invention claimed is:

1. A statistical information generation system comprising:
   circuitry configured to
   acquire location information-storing data including identification information identifying one or more mobile communication terminals, location information on a location of the one or more mobile communication terminals, and time information on a time when the location information is acquired;
   acquire attribute information-storing data including identification information identifying one or more mobile communication terminals, and attribute information on subscribers of the one or more mobile communication terminals;
   acquire search condition information for the location information-storing data and the attribute information-storing data;
   extract a part of the location information-storing data and the attribute information-storing data on the basis of the search condition information, and determine data elements for each combination of extracted location information-storing data and attribute information-storing data which have the same identification information;
   add together, a magnification factor for each of the determined data elements, the magnification factor corresponding to the attribute information included in the respective data element and indicating a degree of magnification to a value of statistical target;
   calculate an estimated value of statistical data on population by using the added magnification factors of the determined data elements;
   count a number of the data elements;
   determine a magnitude of the number of data elements by comparing the number of data elements with a predetermined value; and
   output the estimated value of statistical data when the number of data elements is determined to be larger than a predetermined value, and not output the estimated value of statistical data when the number of data elements is determined to be smaller than the predetermined value.

2. The statistical information generation system according to claim 1, wherein the circuitry is configured to count, as the number of data elements, a number of unique pieces of the identification information in the extracted location information-storing data.

3. The statistical information generation system according to claim 2, wherein the circuitry is configured to count, as the number of data elements, a number of unique pieces of the identification information for each area segment to be included in the statistical data on population.

4. The statistical information generation system according to claim 1, wherein the circuitry is configured to
hold predetermined electronic key information;
receive the identification information included in both the location information-storing data and the attribute information-storing data, and apply a one-way function using the electronic key information to each of the identification information to output unidentifiable information;
delete the identification information from the location information-storing data, and add respective ones of the unidentifiable information as the identification information to the location information-storing data; and
delete the identification information from the attribute information-storing data, and add respective ones of the unidentifiable information as the identification information to the attribute information-storing data.

5. The statistical information generation system according to claim 4, wherein the circuitry is configured to
replace the attribute information included in the attribute information-storing data with abstraction attribute information that is obtained by abstracting information, and
compare the abstracted abstraction attribute information with the search condition information, thereby to extract a part of the unidentifiable attribute information-storing data.

6. The statistical information generation system according to claim 1, wherein the circuitry is configured to
add probability information indicating a matching rate with the search condition information to the location information-storing data, and
calculate the statistical data by multiplying the probability information added to the location information-storing data by the magnification factor.

7. The statistical information generation system according to claim 1, wherein the circuitry is configured to
estimate a value corresponding to an estimated generation density of the location information generated by the mobile communication terminal on the basis of the location information-storing data, and add the value as an amount of feature to the location information-storing data, and
calculate the statistical data by multiplying the amount of feature added to the location information-storing data by the magnification factor.

8. A statistical information generation system comprising:
circuitry configured to
acquire location information-storing data including identification information identifying one or more mobile communication terminals, location information on a location of the one or more mobile communication terminals, and time information on a time when the location information is acquired;
acquire attribute information-storing data including identification information identifying one or more mobile communication terminals, and attribute information on subscribers of the one or more mobile communication terminals;
hold predetermined electronic key information;
receive the identification information included in both the location information-storing data and the attribute information-storing data, and apply a one-way function using the electronic key information to each of the identification information to output unidentifiable information;
delete the identification information from the location information-storing data, and add respective ones of the unidentifiable information to the location information-storing data to generate unidentifiable location information-storing data;
delete the identification information from the attribute information-storing data, and add respective ones of the unidentifiable information to the attribute information-storing data to generate unidentifiable attribute information-storing data;
acquire search condition information for the unidentifiable location information-storing data and the unidentifiable attribute information-storing data;
extract a part of the location information-storing data and the attribute information-storing data on the basis of the search condition information, and determine data elements for each combination of extracted location information-storing data and attribute information-storing data which have the same identification information;
add together, a magnification factor for each of the determined data elements, the magnification factor corresponding to the attribute information included in the respective data element and indicating a degree of magnification to a value of statistical target;
calculate an estimated value of statistical data on population by using the added magnification factors of the determined data elements;
count a number of the data elements;
determine a magnitude of the number of data elements by comparing the number of data elements with a predetermined value; and
output the estimated value of statistical data when the number of data elements is determined to be larger than a predetermined value, and not output the estimated value of statistical data when the number of data elements is determined to be smaller than the predetermined value.

9. A statistical information generation method, implemented by a statistical information generation system having circuitry, comprising:
acquiring location information-storing data including identification information identifying one or more mobile communication terminals, location information on a location of the one or more mobile communication terminals, and time information on a time when the location information is acquired;
acquiring attribute information-storing data including identification information identifying one or more mobile communication terminals, and attribute information on subscribers of the one or more mobile communication terminals;
acquiring search condition information for the location information-storing data and the attribute information-storing data;
extracting a part of the location information-storing data and the attribute information-storing data on the basis of the search condition information, and determining data elements for each combination of extracted location information-storing data and attribute information-storing data which have the same identification information;
adding together, a magnification factor for each of the determined data elements, the magnification factor corresponding to the attribute information included in the respective data element and indicating a degree of magnification to a value of statistical target;
calculating an estimated value of statistical data on population by using the added magnification factors of the determined data elements;
counting a number of the data elements;

determining a magnitude of the number of data elements by comparing the number of data elements with a predetermined value; and outputting the estimated value of statistical data when the number of data elements is determined to be larger than a predetermined value, and not output the estimated value of statistical data when the number of data elements is determined to be smaller than the predetermined value.

\* \* \* \* \*